United States Patent [19]

Hu et al.

[11] Patent Number: 5,444,115
[45] Date of Patent: Aug. 22, 1995

[54] FIRE RESISTANT POLY(METHYL METHACRYLATE) COMPOSITION

[75] Inventors: Yung-Haw Hu; Robert V. Kasowski, both of West Chester, Pa.

[73] Assignee: E. I. Du Pont de Nemours and Company, Wilmington, Del.

[21] Appl. No.: 342,970

[22] Filed: Nov. 21, 1994

[51] Int. Cl.⁶ .................... C08K 7/06; C08K 3/22
[52] U.S. Cl. .................... 524/437; 524/496; 524/560; 525/183
[58] Field of Search .............. 524/437, 456, 560; 525/183; 528/348

[56] References Cited

U.S. PATENT DOCUMENTS

| | | | |
|---|---|---|---|
| 3,827,933 | 8/1974 | Duggins et al. | 524/437 |
| 3,847,865 | 11/1974 | Duggins | 260/42.52 |
| 4,327,013 | 4/1982 | Peters | 524/496 |
| 4,406,662 | 9/1983 | Beran et al. | 8/471 |
| 4,413,089 | 11/1983 | Gavin et al. | 524/785 |
| 4,487,798 | 12/1984 | Dorneier | 524/496 |
| 5,049,597 | 9/1991 | Howard | 524/437 |
| 5,073,587 | 12/1991 | Edwards | 524/496 |
| 5,145,903 | 9/1992 | Duncan | 524/437 |
| 5,171,827 | 12/1992 | Coates et al. | 528/348 |
| 5,235,029 | 8/1993 | Keil | 528/348 |

FOREIGN PATENT DOCUMENTS

0599586A1 1/1994 European Pat. Off. ...... C04B 41/53

*Primary Examiner*—Veronica P. Hoke

[57] ABSTRACT

Compositions of poly(methyl methacrylate) containing alumina trihydrate particularly useful as sheets or other shaped parts in architectural applications such as countertops or wall facings, having improved fire resistance by adding thereto minor amounts of chopped aramid and/or chopped carbon fibers are disclosed.

13 Claims, No Drawings

FIRE RESISTANT POLY(METHYL METHACRYLATE) COMPOSITION

FIELD OF THE INVENTION

This invention concerns poly(methyl methacrylate) compositions useful, for instance, as countertops, wall facings and other architectural items, which are highly filled with certain particulate fillers, and which contain small amounts of certain chopped fibers, which increases the flame resistance of the composition.

BACKGROUND OF THE INVENTION

Highly filled poly(methyl methacrylate) articles, especially in the form of slabs or sheets are used for various architectural purposes, such as in countertops, wall facings, sinks, etc. Many of these uses have decorative as well as utilitarian aspects, since many of these articles have a decorative appearance, such as the appearance of marble or various colors. Often these articles are highly filled with particulate materials such as alumina, hydrated alumina, clay, and/or various pigments. The fillers are often responsible (at least in part) for the decorative appearance.

U.S. Pat. Nos. 3,847,865 published Nov. 12, 1974; 4,413,089 published Nov. 1, 1983; and 4,406,662 published Sep. 27, 1983, each describe certain poly(methyl methacrylate) compositions. European Patent Application 599,586 published June 1, 1994, describes high density artificial stone which is a filled (meth)acrylate polymer which may contain 1–15% chopped glass.

In recent years building codes have become more and more rigorous, requiring a higher level of fire resistance for various building components, including these decorative poly(methyl methacrylate) articles. Therefore compositions which have such improved properties are desired. The present invention provides poly(methyl methacrylate) compositions having a high level of fire resistance.

SUMMARY OF THE INVENTION

This invention provides a composition comprising from about 15 to about 80 percent by weight of a poly(methyl methacrylate) polymer, from about 20 to about 84.9 percent by weight of alumina trihydrate, and from about 0.1 to about 10 percent by weight of at least one chopped fiber selected from the group consisting of an aramid fiber and a chopped carbon fiber.

DETAILED DESCRIPTION OF THE INVENTION

The present invention provides a poly(methyl methacrylate) polymer composition having significantly improved flame resistance. Improved strength in flame results in the material of the present invention retaining its integrity for increased time periods during burning.

The compositions of the present invention contain a poly(methyl methacrylate) polymer. By such a polymer is meant a polymer in which more than 50 mole percent of the repeat units are derived from methyl methacrylate, preferably more than 80 mole percent, and more preferably more than 90 mole percent. The other repeat units may be derived from other monomers which copolymerize with methyl methacrylate under free radical conditions. Such monomers include various acrylates and methacrylates [collectively (meth)acrylates], (meth)acrylamides, acrylic and methacrylic acids, and styrene and substituted styrenes. Included in these copolymerizable monomers are various di- and higher functionality (meth)acrylates, which of course cause crosslinking of the resulting polymer. The poly(methyl methacrylate) polymer is from about 15 to about 80 weight percent of the composition, preferably about 20 to about 45 weight percent.

The poly(methyl methacrylate) component is combined with a particulate filler and a chopped fiber. The particulate filler used herein is alumina trihydrate, formally $Al_2O_3 \cdot 3H_2O$. This compound is available from Alcan Corp., Montreal, Quebec, Canada under the name white hydrate. A useful particle size is 1–100 μm. From about 20 to about 84.9 weight percent of alumina trihydrate is present in the composition, preferably about 55 to about 79.5 weight percent.

The term "fibers" as used herein includes items known as fibers, fibrids, pulp, etc., that have the general configuration of fibers no matter what their actual dimensions. The fiber used in the present invention is an aramid or carbon fiber. Aramid fibers are preferred. The aramid fibers may be made from any aramid, but it is preferred if the aramid does not melt before it decomposes. Preferred aramids are poly(p-phenylene terephthalamide) and poly(m-phenylene isophthalamide). Poly(p-phenylene terephthalamide) is more preferred. Carbon fibers are commercially available and any of the commonly available grades may be used. The carbon fiber may be coated with a material that promotes adhesion to organic polymers. The composition of the present invention contains from about 0.1 to about 10 weight percent of these (aramid or carbon) fibers, preferably from about 0.5 to about 3 weight percent.

The fibers used herein are "chopped". By chopped is meant that the individual fibers are each no more than 10 cm long, preferably from about 0.5 mm to about 20 mm long, more preferably from about 1 mm to about 6 mm long. The aspect ratio of the fibers should be 10 or more, preferably 50 or more.

Minor amounts of other materials may also be present in the composition described herein, such as other particulate materials, colorants, pigments, antioxidants, and other materials normally found in polymeric compositions. The weight percentages given above are relative only to the total of the three essential components of the composition, the methyl methacrylate polymer, alumina trihydrate and chopped fiber.

The use of alumina trihydrate fillers in acrylic polymers gives rise to a structure with a translucency that far exceeds that of acrylic structures filled with other materials such as calcium carbonate or alumina. As such, in thin sheets, it is particularly useful as a lighting panel or similar structure where translucency is necessary or desirable. When alumina trihydrate is incorporated into a pigmented structure with a variegated pattern, the resulting structure has a simulated marble appearance which more closely approximates the appearance of natural marble than other filled acrylics because the internal pigmentation as well as the surface pigmentation contributes to the marbleized effect.

The production of filled poly(methyl methacrylate) compositions is well known in the art, see for instance U.S. Pat. Nos. 3,847,865; 4,413,089; and 4,406,662, which are hereby incorporated by reference. The chopped fiber may be added to the monomer(s) and preformed polymer, if present, before or at the same time as the alumina trihydrate, care being taken to reasonably uniformly disperse the chopped fiber in the monomer(s) before polymerization. Some of the methyl methacrylate polymer may be "prepolymerized" and dissolved in the monomer(s) to be polymerized as described in the above references. The monomer(s) may then be polymerized in the usual fashion, for instance using a thermally activated free radical initiator. Other methods may also be used to form the composition. For instance the composition can be formed by melt blending the polymer with the alumina trihydrate and chopped fiber in a suitable apparatus such as a single or twin screw extruder.

The compositions of the present invention are useful for various architectural purposes, such as in countertops, wall facings, sinks, light panels, and other molded articles. The compositions retain important properties such as translucency, weather resistance, stain resistance, resistance to cracking, and easy machinability, in addition to having improved fire resistance.

In the Examples, the following abbreviations are used:

EDMA-ethylene glycol dimethacrylate
MMA-methyl methacrylate
PMMA-poly(methyl methacrylate)

The fibers used in the Examples were as follows:
1) The poly(p-phenylene terephthalamide) (PPD-T) used was Kevlar ® K29 aramid fiber, available from E. I. du Pont de Nemours and Company, Wilmington, Del., U.S.A., chopped to the appropriate length.
2) The poly(m-phenylene isophthalamide) (MPD-I) used was Nomex ® T-450 aramid fiber, available from E. I. du Pont de Nemours and Company, Wilmington, Del., U.S.A., chopped to the appropriate length.
3) The carbon fiber was obtained from Amoco Performance Products, Greenville, S.C., U.S.A. as grade CT-300, 12K, ¼" chopped 504 NT, and was 0.64 cm long. It contained 2.2 weight percent sizing.

General Procedure

The compositions containing filled methacrylic articles and fibers, and controls containing no fibers were made by the following procedure.

| Ingredients: | | |
|---|---|---|
| ATH | 600.00 g | Alumina Trihydrate |
| PMA | 8.90 g | t-Butyl Peroxymaleic Acid |
| H$_2$O | 0.80 g | |
| Sirup | 384.50 g | MMA + 20% PMMA + 1% EDMA |
| CaOH$_2$ | 4.40 g | 35% Calcium Hydroxide solution in Sirup |
| GDMA | 1.40 g | Glycomercaptoacetic Acid |
| Fiber | As noted in Examples | |

Equipment:
Rolling pin,
4 mil Mylar ® film,
PVA film for mold or form overlayment,
Form or mold to shape the material adjusted to the desired depth,
40 ml disposable beaker (1),
100 ml disposable beakers (2),
1000 ml disposable specimen container (1) for sample prep,
Air-driven mechanical stirrer,
Cole-Parmer Master Servodyne electric stirrer with variable speed control,
Condenser connected to Haake A80 circulator containing ethylene glycol,
2000 ml resin kettle with rubber support insert to hold 1000 ml sample container. Kettle is connected to a vacuum source. Also, a 4-neck resin kettle cover with septums over the unused neck joints The fiber and aluminum trihydrate were weighed out prior to preparing the mix. The Sirup, H$_2$O, and PMA were weighed together, then mixed until all components were dispersed. Aluminum trihydrate was added slowly while increasing the stirring to compensate for any increase in viscosity. The fiber component was added slowly. The fibers were separated as much as possible and the RPM of stirrer was adjusted to compensate for viscosity changes. Mixing was then stopped and the sample container transferred in the resin kettle. The stirrer's RPM was then increased to about 1500 and pressure was reduced to less than 16.8 kPa range. The mixture was monitored for bubble release during this procedure to prevent bumping. Mixing continued under vacuum for a couple minutes or until it appeared that any entrapped air had been released. By syringe, the CaOH$_2$ mixture was added through a septum and mixed only until the GDMA was prepared. By syringe, the GDMA solution was weighed out and added through the septum. The reaction began and was mixed until the temperature had risen about 3° C. The stirrer RPM was decreased until stopped and the vacuum released. The kettle was lowered and the sample container removed. Immediately the sample was poured into the prepared mold or form. The upper surface of the mixture was rolled smooth using a rolling pin covered with Mylar ® film. It was then covered with an aluminum (0.63 cm thick) sheet and a weight for heat dissipation and allowed to stand until completely solidified.

Testing

The following tests were used to test the methacrylic articles produced. In any set of these tests the important item is the relative ranking of the samples (including control), not the absolute values obtained.

Flame Test

The composition to be tested was prepared in strips or bars of about 0.64×0.64×10-15 cm long with holes drilled at both ends. One end is attached by a string support. The other end is attached to a string which is in turn attached to a 500 g weight. The bar is held horizontally by the strings. A Bunsen burner (fuel was propane) flame approximately 3.8 cm high was applied to the middle of the sample bar so that that the top of the burner was about 1.9 cm from the bottom surface of the bar. The time until the weight falls due to burning through the sample bar was a measure of the flame resistance of the bar material. The time was recorded in seconds, with longer times indicating better flame resistance.

Oven Test

An electric furnace made by Lindberg Co., Model 51848, 1700 watts max., 50/60 Hertz, 120/240 volts was used. The furnace was preheated to 450° C. The door was opened and the sample was quickly placed inside on a rack approximately 1.2 cm above the furnace floor. The door was closed and the clock was started. At exactly ten minutes, the sample was removed and weighed after cooling about ten minutes. The equilibrium oven temperature was reached in about two minutes, as opening of the oven door caused the oven temperature to decrease to about 390° C. The weights before and after the oven treatment were compared for weight lost. Samples with a small weight loss were considered to have better flame resistance. The test piece was a plaque 5.1×7.6×0.64 cm.

EXAMPLES 1-9

Compositions were made using the general procedure described above containing various fibers, and subjected to the flame test. The "Control" contained no fibers. The fiber used, its concentration, and the fall times for the 500 g weight are given in Table I. Other compositions prepared using the general procedure described above were subjected to the oven test, see Table II for results.

TABLE I

| Example | Fiber (wt %) | Fiber Length (mm) | Time (sec) |
|---|---|---|---|
| Control | None | — | 35, 37 |
| 1 | PPD-T (0.33) | 6.4 | 100, 89, 82 |
| 2 | PPD-T (0.22) | 0.5 | 41, 41 |
| 3 | Carbon (0.33) | 6.4 | 72, 86 |
| 4 | MPD-I (0.33) | 6.4 | 97, 102 |

PPD-T is poly(p-phenylene terephthalamide)
MPD-I is poly(m-phenylene isophthalamide)

TABLE II

| Example | Fiber (wt %) | Fiber Length (mm) | % Weight Loss |
|---|---|---|---|
| Control | None | — | 27 |
| 5 | PPD-T (0.33) | 6.4 | 19 |
| 6 | PPD-T (0.66) | 3 | 17 |
| 7 | PPD-T (0.66) | 1 | 22.5 |
| 8 | MPD-I (0.33) | 6.4 | 20 |
| 9 | Carbon (0.33) | 6.4 | 21 |

PPD-T is poly(p-phenylene terephthalamide)
MPD-I is poly(m-phenylene isophthalamide)

What is claimed is:

1. A composition comprising from about 15 to about 80 percent by weight of a poly(methyl methacrylate) polymer, from about 20 to about 84.9 percent by weight of alumina trihydrate, and from about 0.1 to about 10 percent by weight of at least one chopped fiber selected from the group consisting of an aramid fiber and a carbon fiber.

2. The composition of claim 1 wherein from about 20 to about 45 percent is said poly(methyl methacrylate) polymer, from about 55 to about 79.5 percent is said alumina trihydrate, and from about 0.5 to about 3 percent is said chopped fiber.

3. The composition of claim 1 wherein said chopped aramid fiber and said chopped carbon fiber are each independently from about 0.5 mm to about 20 mm long.

4. The composition of claim 2 wherein said chopped aramid fiber and said chopped carbon fiber are each independently from about 0.5 mm to about 20 mm long.

5. The composition of claim 1 wherein said chopped aramid fiber and said chopped carbon fiber are each independently from about 1 mm to about 6 mm long.

6. The composition of claim 2 wherein said chopped aramid fiber and said chopped carbon fiber are each independently from about 1 mm to about 6 mm long.

7. The composition of claim 1 wherein the chopped fiber is said chopped aramid fiber.

8. The composition of claim 7 wherein said chopped aramid fiber is poly(p-phenylene terephthalamide) or poly(m-phenylene isophthalamide).

9. The composition of claim 7 wherein said chopped aramid fiber is poly(p-phenylene terephthalamide).

10. The composition of claim 4 wherein the chopped fiber is said chopped aramid fiber.

11. The composition of claim 10 wherein said chopped aramid fiber is poly(p-phenylene terephthalamide) or poly(m-phenylene isophthalamide).

12. The composition of claim 10 wherein said chopped aramid fiber is poly(p-phenylene terephthalamide).

13. A method of improving the fire resistance of a composition comprising from about 15 to about 80 percent by weight poly(methyl methacrylate) polymer and from about 20 to about 84.9 percent by weight alumina trihydrate comprising adding from about 0.1 to about 10 percent by weight of at least one of a chopped fiber selected from the group consisting of a chopped aramid fiber and a chopped carbon fiber.

* * * * *